(12) United States Patent
Sipkema et al.

(10) Patent No.: US 8,139,801 B2
(45) Date of Patent: Mar. 20, 2012

(54) HEARING AID GLASSES USING ONE OMNI MICROPHONE PER TEMPLE

(75) Inventors: Marcus Karel Sipkema, Arnhem (NL); Jacob van der Zwan, Rotterdam (NL)

(73) Assignee: Varibel B.V., Meppel (NL)

( * ) Notice: Subject to any disclaimer, the term of this patent is extended or adjusted under 35 U.S.C. 154(b) by 584 days.

(21) Appl. No.: 12/303,135

(22) PCT Filed: Mar. 31, 2007

(86) PCT No.: PCT/NL2007/050256
§ 371 (c)(1),
(2), (4) Date: Dec. 2, 2008

(87) PCT Pub. No.: WO2007/142520
PCT Pub. Date: Dec. 13, 2007

(65) Prior Publication Data
US 2009/0252360 A1    Oct. 8, 2009

(30) Foreign Application Priority Data
Jun. 2, 2006   (NL) ...................................... 2000085

(51) Int. Cl.
*H04R 25/00* (2006.01)
(52) U.S. Cl. .................. 381/327; 381/313; 381/324
(58) Field of Classification Search ............... 381/23.1, 381/313, 322, 324, 327, 281, FOR. 128, FOR. 132
See application file for complete search history.

(56) References Cited

U.S. PATENT DOCUMENTS

| 3,247,330 | A  |   | 4/1966  | Hinman |
|-----------|----|---|---------|--------|
| 3,770,911 | A  |   | 11/1973 | Knowles et al. |
| 3,835,263 | A  | * | 9/1974  | Killion .......................... 381/313 |
| 4,904,078 | A  |   | 2/1990  | Gorike |
| 6,222,927 | B1 | * | 4/2001  | Feng et al. ................... 381/94.2 |

FOREIGN PATENT DOCUMENTS

| CH | 660 531    | 4/1987  |
| DE | 195 00 442 | 7/1996  |
| FR | 2 642 856  | 8/1990  |
| GB | 975 891    | 11/1964 |

OTHER PUBLICATIONS

International Search Report dated Aug. 14, 2007, from corresponding PCT application.

* cited by examiner

*Primary Examiner* — Matthew E Warren
(74) *Attorney, Agent, or Firm* — Young & Thompson

(57) ABSTRACT

Hearing glasses with a left temple and a right temple connected to a front portion supporting a pair of lenses, at least one temple with one single microphone and a processor connected to the single microphone. The single microphone is an omnidirectional microphone and located in the temple such that, when the hearing glasses are worn by a human's head where the at least one temple is at a predetermined side of the head, the single microphone can receive sound substantially unblocked by the head from sound sources both at a left and right frontal side of the head, as well as from one back side of the head corresponding to the predetermined side of the head.

4 Claims, 3 Drawing Sheets

Freq. = 250 DI = 1.5    Freq. = 500 DI = 0.9    Freq. = 1000 DI = 2.7

Freq. = 2000 DI = 4.0    Freq. = 4000 DI = 2.3    Freq. = 6300 DI = -0.6

HEARING AID GLASSES USING ONE OMNI MICROPHONE PER TEMPLE

FIELD OF THE INVENTION

Speech intelligibility in noise is the most important need of a hearing impaired. The only proven arrangement is a directional hearing aid, through which sound from the front of a user is amplified and sounds from other directions are damped. However, directional hearing aids have the disadvantage that the directional profile, or polar diagram, varies for different frequencies. For example, for low frequencies the directional hearing aid is less directional than for medium and high frequencies. In addition, the polar diagrams show notches, i.e., specific directions from which sounds are strongly damped, that vary in direction per frequency. This results in lower sound quality of directional hearing aids than that of omni-directional hearing aids.

Another issue with directional hearing aids is that their actual directionality is lower when tested on the head of a user, than when tested on a lab turntable. This is caused by the fact that the ear of a person is located more towards the back of the head than to the front. Therefore, the microphones of a directional behind-the-ear hearing aid are located closer to the back than to the front of the head. Thus the head blocks more sounds coming from the front than from the back, diminishing the directionality of the hearing aid.

Directional hearing aids use an array of 2 or more omni-directional microphones. These 2 or more microphones must be phase-matched relative to one another during production. Otherwise the signals of the different microphones of the array partially cancel each other out. This makes the production of directional hearing aids expensive. Furthermore, microphones change in phase over time. This results in a deterioration of the phase matching of the microphones in the array over time, and thus in decreasing directionality over time.

The object of the invention is to provide hearing glasses with broadband directionality while worn by the user on the head, without the requirement of phase matching of the microphones, thus being not costly to produce.

PRIOR ART

Several types of directional hearing aid glasses using an array of microphones per temple have been proposed in the past, see e.g. EP-A-1025744, WO2004/028203, and prior art referred to in files relating to these documents.

SUMMARY OF THE INVENTION

To obtain the object of the invention, it provides hearing aid glasses as defined in claim 1. Embodiments are defined in the dependent claims.

The present invention is directed to broadband directional hearing glasses, with good directionality while worn by the user on the head, without the requirement of phase matching of the microphones, thus being cost efficient to produce.

BRIEF DESCRIPTION OF THE DRAWINGS

The present invention will be explained in detail with reference to some drawings which are only intended for illustrative purposes and not to limit the scope of the invention. The scope is defined by the annexed claims and its equivalents.

DESCRIPTION OF THE PREFERRED EMBODIMENT

Figure 1:
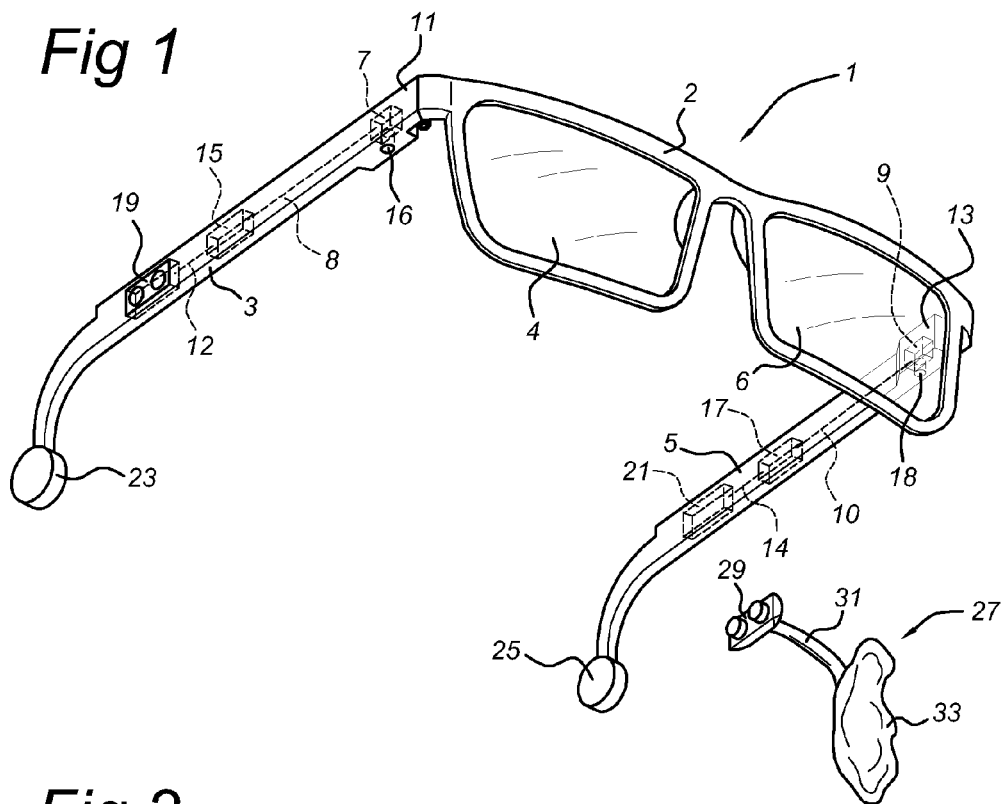
FIG. 1 shows an example of hearing glasses according to the invention.

FIG. 1 shows hearing glasses 1. The hearing glasses 1 comprise two temples 3, 5. Each temple 3, 5 comprises one microphone 7, 9 located at the front side of the temple 3, 5, i.e., at the side where the temple 3, 5 connects to a front portion 2 of the hearing glasses that supports lenses 4, 6. A suitable connection is by means of hinges 11, 13.

Each microphone 7, 9 is connected to a processor 15, 17 via a suitable wire 8, 10. The processors 15, 17 are connected to a connector 19, 21 via suitable wires 12, 14. The connectors 19, 21 are designed to be connected to an earpiece of which only one 27 is shown. The earpiece 27 comprises a connector 29 designed to be connected to the connector 19, 21, a connecting unit 31 and an ear unit 33 to be located in a human's ear. The earpiece 27 comprises a loudspeaker, e.g., in the connector 29 or in the ear unit 33. At its backside 23, 25, each temple 3, 5 is designed to accommodate a battery (not shown) arranged to provide electrical power to the electrical components in the temple 3, 5. Further constructive details of such temples 3, 5 and such an earpiece 27 may be derived from PCT/NL2006/050123.

The processors 15, 17 are arranged to receive microphone signals from the microphones 7, 9 and to process these microphone signals to produce control signals for the loudspeakers which convert these control signals into sound for the human ear.

The microphones 7, 9 are both omnidirectional microphones. In FIG. 1, an embodiment is shown in which the microphones 7, 9 have respective inlets 16, 18 for receiving ambient sound at an lower side of the temples 3, 5.

Figure 2:
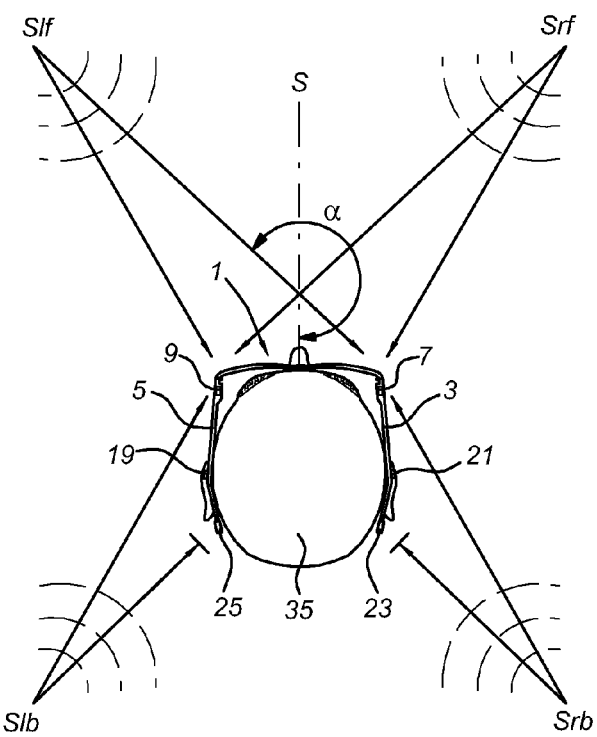
FIG. 2 shows hearing aid glasses of FIG. 1 in use, i.e., when worn by a user.

The position of the one omnidirectional microphones 7, 9 in the front of the temples 3, 5 is such that both microphones 7, 9 can receive substantially all sounds from both the right and left frontal direction. This is further illustrated in FIG. 2. FIG. 2 shows four sound sources relative to a user's head 35 wearing hearing glasses according to FIG. 1: a sound source Slf at a left frontal position of the user, a sound source Srf at a right frontal position of the user, a sound source Slb at a left back position of the user, and a sound source Srb at a right back position of the user. Microphone 9 is arranged to receive sound unblocked by head 35 from sound sources Slb, Slf, and Srf, whereas microphone 7 is arranged to receive sound unblocked by head 35 from sound sources Srb, Srf, and Slf.

To that end, each microphone 7, 9 may be located on temple 3, 5 within a distance of 3 cm from a surface in which lenses 4, 6 are located. Defined in an other way: each microphone 7, 9 can hear sound unobstructed by the human head 35 from sound sources in an area defined by two lines. The first line is parallel to the temple concerned and directs backwards. The second line directs forward and intersects the position of the microphone 7, 9. The angle between these lines, indicated by α in FIG. 2, is at least $5/4 \cdot \pi$.

The best position for the microphone inlets 16, 18 would be directed towards the front of the hearing glasses 1, i.e., in the front portion 2 of the hearing aid glasses 1. However traditional hearing aid glasses show a specific vulnerability, where they often break down. This is the electric cable(s) that goes alongside the hinges 11, 13, connecting the front portion 2 of the hearing glasses 1 with the temples 3, 5. These cables invariably break down over the years, after thousands of times of bending. Therefore the microphones 7, 9 must be positioned in the temples 3, 5 of the hearing glasses 1, not at the front portion 2 of the hearing glasses 1, so that no electric cable goes alongside the hinges 11, 13 of the hearing glasses 1.

While positioned in the front of the temple, the microphone inlets 16, 18 can be directed downward, or upward, or to the left or to the right of the temples 3, 5. When the microphone inlets 16, 18 are directed upward or downward, they can receive sounds from both the right and left frontal direction unblocked. The microphone inlets 16, 18 directed downward have the extra advantage that precipitation cannot enter directly into the inlets 16, 18, which is the case with the microphone inlets 16, 18 directed upward. Thus a very good embodiment is a pair of hearing aid glasses with one omnidirectional microphone 7, 9 positioned in the front of at least one of the temples 3, 5, with its microphone inlet 16, 18 directed downward.

Figure 4:
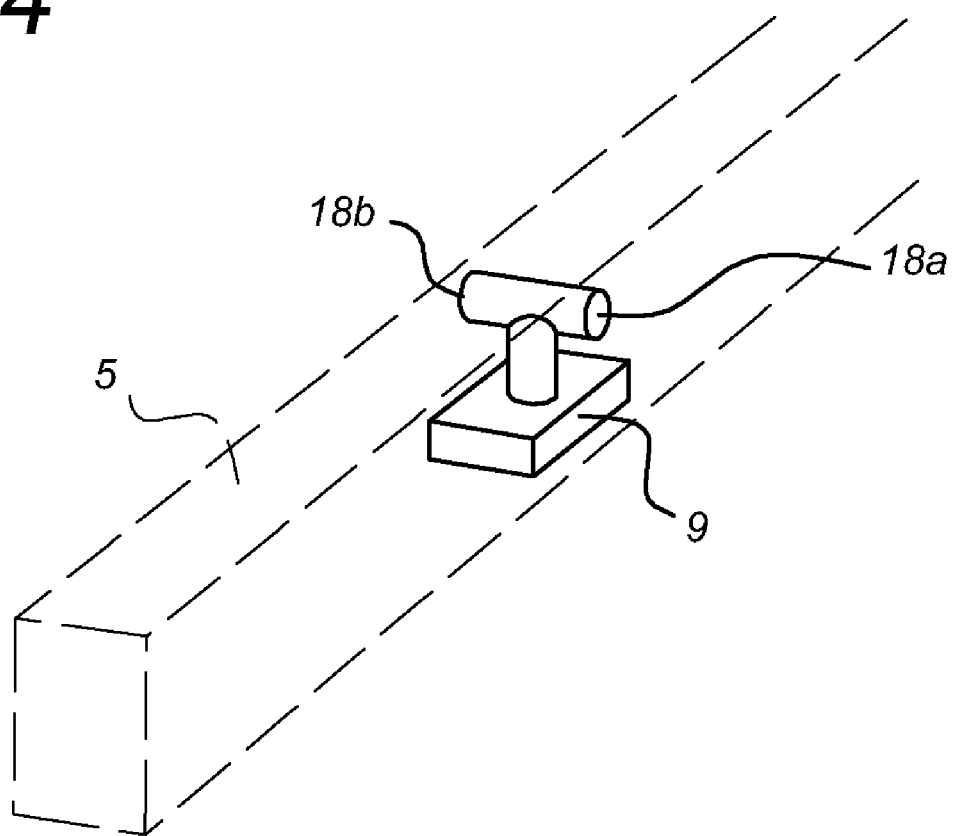
FIG. 4 shows an alternative arrangement for a microphone in a temple.

To receive largely all sounds from both the right and left frontal direction, unfavorable positions for the microphone inlet 16, 18 are to the left or to the right of the temple 3, 5, as in those cases one of the frontal directions is partially blocked by the temple itself. I.e., if microphone 9 would have its inlet 18 directed to the left side in the arrangement shown in FIG. 2, the sound from sound source Srf would be substantially blocked from reaching microphone 9. However, an alternative solution to this problem is to have a dual inlet 18 *a*, 18*b* from both the left and the right side of the temple, both going toward the inlet of the one microphone 9, as shown in FIG. 4. In this case, sounds from both the right and left frontal direction reach the microphone 9 unobstructed. This is a second embodiment. Of course, this holds true for microphone 7 too.

Thus, in accordance with the invention, the position of one omnidirectional microphone 7, 9 at the front of the temple 3, 5 is such that the microphone 7, 9 can receive substantially all sounds from sound sources Srf, Slf at the right and left frontal direction. For a microphone 7, 9 in that position, the head 35 of the user is partially blocking sound from the back. For microphone 7 positioned in the front of the right temple 3 of the hearing aid glasses 1, the head 35 blocks sound coming from the left back source Slb, while sound from the right back source Srb is received without obstruction. For microphone 9 positioned in the front of the left temple 5 of the hearing aid glasses 1, the head 35 blocks sound coming from the right back source Srb, while sound from the left back source Slb is received without obstruction. Thus, one omnidirectional microphone positioned in the front of a temple of a pair of hearing aid glasses 1 while worn on the head receives all sounds from the front, while receiving only part of the sound from the back. This results in directionality, with a positive directivity index.

Figure 3A:
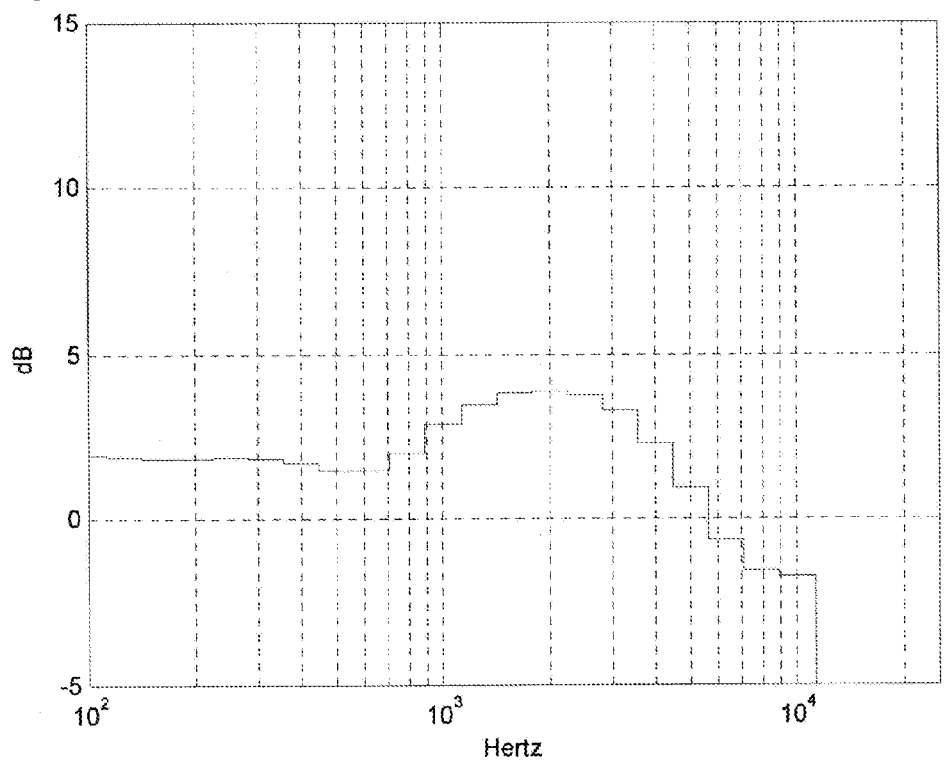
FIGS. 3a and 3b show the directivity per frequency of one temple of the hearing aid glasses, with 1 omni microphone in the front of the temple and the microphone inlet directed downwards.
Figure 3B:
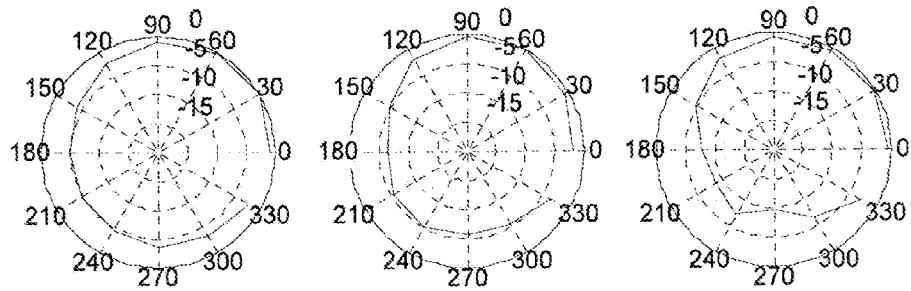
Figure 3B:
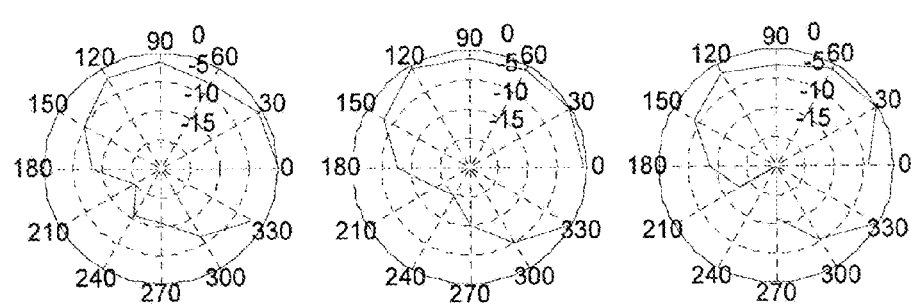

In FIGS. 3*a* and 3*b* results of directivity measurements are presented of hearing aid glasses 1 with one omnidirectional microphone positioned in the front of a temple while worn on the head. The microphone inlet was directed downwards, while the hearing aid glasses 1 were mounted on an artificial head and torso simulator (KEMAR). The measurement method used was: ANSI S3.35. The measured ANSI directivity index is +2.7 dB. This is a higher directivity then current directional behind-the-ear hearing aids achieve while worn on a head.

As shown in FIGS. 3*a*, 3*b*, the omnidirectional microphone produces a wide broadband spectrum signal, similar for all audible sound frequencies. The good broadband characteristics are not diminished through signal processing to obtain directionality. Furthermore, the omni directional microphone by definition has no notches in certain directions. Thus this invention provides broadband directionality without a compromise in sound quality, nor with notches in certain directions that vary per frequency.

As the invention uses one omnidirectional microphone per temple, there is no requirement for phase matching. Thus this invention does not have the problem of deteriorating phase matching over the years, and is very cost efficient to produce.

The invention claimed is:

1. Hearing glasses with a left temple and a right temple connected to a front portion supporting a pair of lenses, at least one temple of the left temple and the right temple comprising:

one single microphone and a processor connected to the single microphone, the single microphone being an omnidirectional microphone and located in said at least one temple, upon use of the hearing glasses on a human's head, and the at least one temple is on a predetermined side of the head, the single microphone receives sound unblocked by the head and unblocked by said at least one temple from sound sources both at a left and right frontal side of the head, and from one back side of the head corresponding to said predetermined side of the head, said single microphone being arranged on said at least one temple to, upon use, hear sound unobstructed by the head and unobstructed by said at least one temple from sound sources located in an area defined by a first and a second line as seen from a top view, the first line being parallel to the temple and directing backwards, the second line directing forward and intersecting the position of the single microphone on the at least one temple, said first and second lines being at an angle of at least $5/4 \cdot \pi$, wherein said at least one temple comprises at least one of a microphone inlet associated with said single microphone, is directed downward, upon the hearing glasses being worn on the human's head, and two microphone inlets associated with said single microphone, are both directed in a horizontal plane, upon the hearing glasses being worn on the human's head.

2. The hearing glasses according to claim 1, wherein said lenses are located in a predetermined surface, said single microphone being located within a distance of 3 cm from said surface.

3. The temple for hearing glasses according to claim 1, said temple comprising one single microphone and a the microphone inlet associated with said microphone, and a processor connected to the single microphone, the single microphone being an omnidirectional microphone and located in said at least one temple such that, upon the temple's use as part of said hearing glasses at a predetermined side of a human's head, the single microphone can receives sound unblocked by the head and unblocked by said temple from sound sources both at a left and right frontal side of the head, and from one back side of the head corresponding to said predetermined side of the head, and said single microphone being arranged on said temple to, upon use, hear sound unobstructed by the head and unobstructed by said temple from sound sources located in an area defined by a first and a second line as seen from a top view, the first line being parallel to the temple and directing backwards, the second line directing forward and intersecting the position of the single microphone on the temple, said first and second line being at an angle of at least $5/4\cdot\pi$, wherein said temple comprises at least one of

- a microphone inlet associated with said single microphone, directed downward, upon use of the temple on a human's head, and
- two microphone inlets associated with said single microphone, both directed in a horizontal plane, upon use of the temple on the human's head.

4. The hearing glasses according to claim 1, wherein both said left and right temple have a said single omnidirectional microphone is located on said left temple, said right temple comprising one further single microphone, said processor being connected to the further single microphone, the further single microphone being a further omnidirectional microphone and located in said right temple such that, upon the hearing glasses being worn on a human's head and the right temple is at a right side of the head, the single microphone receives sound unblocked by the head and unblocked by said right temple from sound sources both at a left and right frontal side of the head, and from one back side of the head corresponding to said right side of the head, said further single microphone being arranged on said right temple to, in use, hear sound unobstructed by the head and unobstructed by said right temple from sound sources located in a further area defined by a third and a fourth line as seen from said top view, the third line being parallel to the right temple and directing backwards, the fourth line directing forward and intersecting the position of the further single microphone on the right temple, said third and fourth line being at an angle of at least $5/4\cdot\pi$, wherein said right temple comprises at least one of

- a further microphone inlet associated with said further microphone, is directed downward, upon the hearing glasses being worn on the human's head, and
- two further microphone inlets associated with said further single microphone, are both directed in a further horizontal plane, upon the hearing glasses being worn on the human's head.

* * * * *

UNITED STATES PATENT AND TRADEMARK OFFICE
CERTIFICATE OF CORRECTION

| | | |
|---|---|---|
| PATENT NO. | : 8,139,801 B2 | Page 1 of 1 |
| APPLICATION NO. | : 12/303135 | |
| DATED | : March 20, 2012 | |
| INVENTOR(S) | : Sipkema et al. | |

It is certified that error appears in the above-identified patent and that said Letters Patent is hereby corrected as shown below:

On the title page, please amend Item (22) to read as follows:

-- (22) PCT Filed: May 31, 2007 --

Signed and Sealed this
Eighth Day of May, 2012

David J. Kappos
*Director of the United States Patent and Trademark Office*